United States Patent
Lewandowski et al.

(10) Patent No.: US 12,235,646 B2
(45) Date of Patent: Feb. 25, 2025

(54) SYSTEM AND METHOD FOR ASSISTING A DOCKING OPERATION

(71) Applicant: Ford Global Technologies, LLC, Dearborn, MI (US)

(72) Inventors: Andrew Denis Lewandowski, Sterling Heights, MI (US); Jordan Barrett, Milford, MI (US); Brendan Diamond, Grosse Pointe, MI (US); Keith Weston, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 331 days.

(21) Appl. No.: 17/571,849

(22) Filed: Jan. 10, 2022

(65) Prior Publication Data

US 2023/0221724 A1 Jul. 13, 2023

(51) Int. Cl.
| | | |
|---|---|---|
| *G05D 1/00* | (2024.01) | |
| *B60Q 1/24* | (2006.01) | |
| *B63B 79/10* | (2020.01) | |
| *B63B 79/40* | (2020.01) | |
| *B63H 21/21* | (2006.01) | |

(52) U.S. Cl.
CPC ............ *G05D 1/0206* (2013.01); *B60Q 1/24* (2013.01); *B63B 79/10* (2020.01); *B63B 79/40* (2020.01); *B63H 21/21* (2013.01)

(58) Field of Classification Search
None
See application file for complete search history.

(56) References Cited

U.S. PATENT DOCUMENTS

| | | | |
|---|---|---|---|
| 6,707,414 B2 | 3/2004 | Van Rees et al. | |
| 6,995,662 B2 | 2/2006 | Wortsmith | |
| 7,389,735 B2 | 6/2008 | Kaji et al. | |
| 8,622,778 B2 | 1/2014 | Tyers et al. | |
| 10,931,934 B2 | 2/2021 | Richards et al. | |
| 11,899,465 B2* | 2/2024 | Johnson | G05D 1/692 |
| 2015/0198950 A1* | 7/2015 | Kallaway | B63B 27/34 701/21 |
| 2019/0137993 A1* | 5/2019 | Bertrand | B63H 25/02 |
| 2021/0094665 A1 | 4/2021 | Schmid et al. | |
| 2021/0200210 A1* | 7/2021 | Gil | G06Q 10/0832 |
| 2021/0206459 A1 | 7/2021 | Johnson et al. | |
| 2021/0247767 A1 | 8/2021 | Tyers | |
| 2021/0269128 A1* | 9/2021 | Rivers | B63B 79/40 |

(Continued)

FOREIGN PATENT DOCUMENTS

EP 1873052 B1 10/2009

*Primary Examiner* — Todd Melton
*Assistant Examiner* — Sarah A. Mueller
(74) *Attorney, Agent, or Firm* — Frank Lollo; Price Heneveld LLP

(57) ABSTRACT

A vehicle for assisting a docking operation for a marine vessel. The vehicle includes a position sensor operable to detect a position of the marine vessel. A first controller is communicatively coupled with the position sensor. The first controller is operable to receive a first instruction from a second controller corresponding to the marine vessel to monitor the position sensor. The first controller is further operable to receive positional data corresponding to the position of the marine vessel relative to a dock. The first controller is further operable to communicate the positional data to the second controller to assist with the docking operation.

14 Claims, 8 Drawing Sheets

(56) References Cited

U.S. PATENT DOCUMENTS

| | | | |
|---|---|---|---|
| 2021/0347449 A1* | 11/2021 | Dake | B63B 69/00 |
| 2022/0122465 A1* | 4/2022 | Wilhelmsson | G08G 5/0013 |
| 2023/0150625 A1* | 5/2023 | Moses | B64D 47/08 |
| | | | 244/17.23 |

* cited by examiner

SYSTEM AND METHOD FOR ASSISTING A DOCKING OPERATION

FIELD OF THE DISCLOSURE

The present disclosure generally relates to boat docking operations and, more particularly, to systems and methods utilizing boat-to-vehicle communication to assist in boat docking operations.

BACKGROUND OF THE DISCLOSURE

Docking a boat may be challenging. An operator of the boat may have trouble identifying the location of the dock due to low visibility, imprecise measurement data, and the like. Further, the particular slip assigned to the boat may be difficult to recall or identify when the boat is distant from shore. Accordingly, improved systems and methods for aiding in a boat-docking operation may be desired.

SUMMARY OF THE DISCLOSURE

According to a first aspect of the present disclosure, a vehicle for assisting a docking operation for a marine vessel. The vehicle includes a position sensor operable to detect a position of the marine vessel. A first controller is communicatively coupled with the position sensor. The first controller is operable to receive a first instruction from a second controller corresponding to the marine vessel to monitor the position sensor. The first controller is further operable to receive positional data corresponding to the position of the marine vessel relative to a dock. The first controller is further operable to communicate the positional data to the second controller to assist with the docking operation.

Embodiments of the first aspect of the present disclosure can include any one or a combination of the following features:
- the position sensor is an imager operable to capture image data corresponding to the marine vessel;
- one of the first controller and the second controller is in communication with an image processor operable to process the image data to identify a space between the marine vessel and the dock;
- the image processor is operable to modify the image data to indicate the space;
- the first controller is further operable to communicate a second instruction to display the image data on an interface associated with the second controller;
- the position sensor is one of a RADAR sensor, a LIDAR sensor, and an ultrasonic sensor;
- the first controller is further operable to receive location data corresponding to a proximity of the vehicle relative to the marine vessel, and control the vehicle to move the vehicle toward the marine vessel based on the location data;
- the first controller is further operable to receive a third instruction to operate a lighting system of the vehicle, wherein the lighting system is operable to direct light toward the marine vessel;
- the second controller is included with one of a mobile device associated with a passenger of the marine vessel and an on-board controller operable to control at least one actuator of the marine vessel;
- the second controller is further operable to receive, from the first controller, a fourth instruction to control the marine vessel;
- the second controller is further operable to control an engine of the marine vessel in response to the fourth instruction;
- the first controller is further operable to determine a user identity corresponding to a passenger of the vehicle, and communicate user preference data to the second controller based on the user identity, and wherein the second controller is further operable to control the marine vessel based on the user preference data in response to the fourth instruction; and
- the user preference data includes one of a climate control preference and a seating position preference.

According to a second aspect of the present disclosure, a method for assisting a docking operation of a marine vessel includes monitoring, via a first controller of a vehicle, a position sensor operable to detect a position of the marine vessel. The method further includes receiving, from a second controller corresponding to the marine vessel, a first instruction from the first controller to monitor the position sensor. The method further includes receiving, at the first controller, positional data corresponding to the position of the marine vessel relative to a dock. The method further includes communicating the positional data to the second controller to assist with the docking operation.

Embodiments of the second aspect of the present disclosure can include any one or a combination of the following features:
- capturing, via an imager of the vehicle, an image of the marine vessel, and processing the image in an image processor to identify a space between the marine vessel and the dock;
- modifying, via the image processor, the captured image to indicate the space
- receiving, at the first controller, location data corresponding to a proximity of the vehicle relative to the marine vessel, and controlling the vehicle to move the vehicle toward the marine vessel based on the location data;
- receiving, at the second controller, a second instruction from the first controller to control the marine vessel; and
- determining a user identity corresponding to a passenger of the vehicle, communicating user preference data to the second controller based on the user identity, and controlling, via the second controller, the marine vessel based on the user preference data in response to the second instruction.

According to a third aspect of the present disclosure, a vehicle for assisting a docking operation for a marine vessel includes a position sensor operable to detect a position of the marine vessel. A first controller is communicatively coupled with the position sensor. The first controller is operable to receive an instruction from a second controller corresponding to the marine vessel to monitor the position sensor, receive location data corresponding to a proximity of the vehicle relative to the marine vessel. The first controller is further operable to control the vehicle to move toward the marine vessel based on the location data. The first controller is further operable to receive positional data corresponding to a space between the marine vessel and a dock. The first controller is further operable to communicate the positional data to the second controller to assist with the docking operation.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

As required, detailed embodiments of the present disclosure are disclosed herein; however, it is to be understood that the disclosed embodiments are merely exemplary of the disclosure that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present disclosure.

Figure 1:
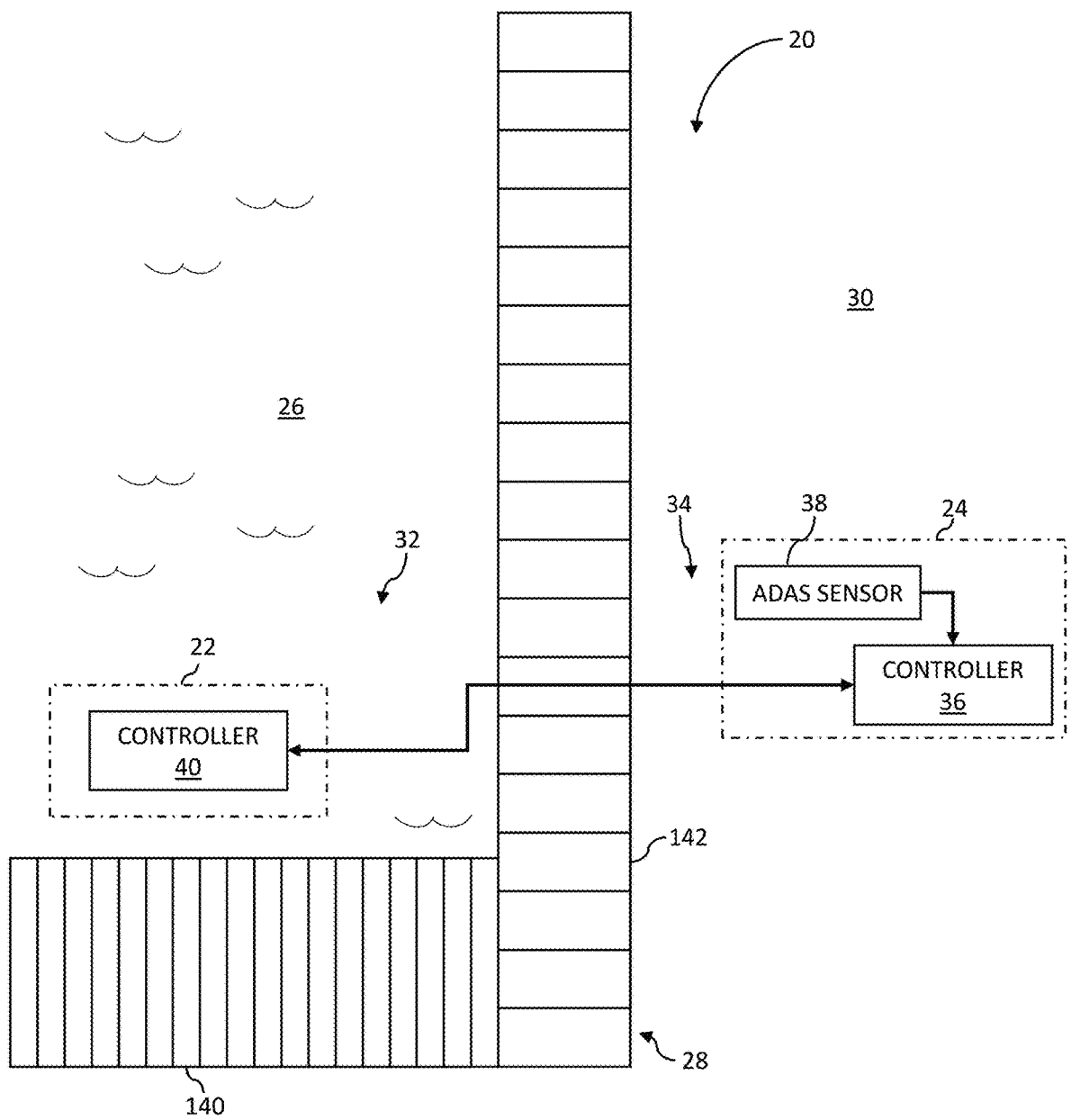
FIG. 1 depicts a block diagram overlaying a top view of a system for assisting a docking operation for a marine vessel at a boat dock according to one aspect of the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to an assisted docking operation. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring generally to FIGS. 1-7, reference numeral 20 designates a docking assist system for a marine vessel 22. In general the system incorporates a vehicle 24, water vehicle (e.g., boat), land vehicle (truck, ATV, car, van, etc.), air vehicle (airplane, drone, etc.), or the like, to provide docking information to an operator of the marine vessel 22 positioned in a body of water 26 and/or a controller associated with the marine vessel 22. For example, various sensors already included in the vehicle 24 may be employed to capture various aspects of a docking operation of the marine vessel 22, such as the location of a dock 28 and/or land 30 relative to the marine vessel 22. It is generally contemplated that the docking operation may include a mooring operation, a parking operation for positioning the marine vessel 22 within a berth or slip, an anchoring operation, or the like. In general, the dock 28 may refer to any unsubmerged or partially submerged location typically utilized for securing a boat (e.g., a post, a slip, planking, a mooring, a boardwalk, a pier, etc.). In some configurations, sensors typically included in advanced driver-assistance systems (ADAS) may be employed to capture video data, image data, distance data, wind speed data, and the like, and communicate that information to a user of the marine vessel 22 and/or an onboard controller of the marine vessel 22. In addition, the vehicle 24 may be operable to project light via headlights of the vehicle 24 onto an area where the marine vessel 22 resides and/or a parking area for the boat 22 (e.g., a slip). Further, a controller onboard the vehicle 24 may be operable to communicate control signals to a controller onboard the marine vessel 22 to directly control various outputs of the marine vessel 22. In this way, the marine vessel 22 may operate autonomously and/or remotely via a remote controller.

The system 20 may also be configured to control the vehicle 24 autonomously to move the vehicle 24 toward the marine vessel 22 prior to, during, or after the marine vessel 22 is docked in the slip. For example, and as discussed further herein, an event of the marine vessel 22 returning to a docking area 32 may be communicated from the marine vessel 22 to the vehicle 24. This event may cause the vehicle 24 to automatically start an engine and travel to a destination associated with a desired docking position of the marine vessel 22. For example, a specific slip corresponding to a passenger of the marine vessel 22 (e.g., owned by or assigned to the passenger), may be positioned near a parking spot or another accessible area 34 for the vehicle 24 to which the vehicle 24 is traveling. In this way, the system 20 may operate to control either or both of the marine vessel 22 and the vehicle 24.

Referring now to FIG. 1, the vehicle 24 may include a first controller 36 and a position sensor 38. The position sensor 38 may be operable to detect a position of the marine vessel 22. For example, the position sensor 38 may be a camera operating with a field of view that captures an image of the marine vessel 22, a proximity sensor, a capacitive sensor, an ultrasonic sensor, a RADAR (radio detection and ranging) sensor, a LIDAR (light detection and ranging) sensor, or the like. The first controller 36 may be communicatively coupled with the position sensor 38, such that the position sensor 38 may feed data (such as the positon data) to the first controller 36. The marine vessel 22 may include a second controller 40 in communication with the first controller 36. It is generally contemplated that the second controller 40 may be associated with a passenger aboard or adjacent to the marine vessel 22 (i.e., on the dock 28), or may be an onboard controller that is an electrical communication with various outputs that control the marine vessel 22.

The first controller 36 may be operable to receive a first instruction from the second controller 40 to monitor the position sensor 38, receive positional data related to the position of the marine vessel 22, relative to the dock 28, and communicate the positional data to the second controller 40 during a docking operation. In this way, data gathered from existing data sensors may be utilized to help a passenger of the marine vessel 22 park the marine vessel 22 without damaging either the marine vessel 22 or the dock 28. For example, and as discussed later herein, the sensor 38 may detect the bow of the marine vessel 22 nearing an edge of the dock 28. Similarly, the sensing device 38 may detect the port or starboard sides of the boat 22 nearing a contact point with the dock 28 or posts protruding from the body of water 26.

Figure 2:
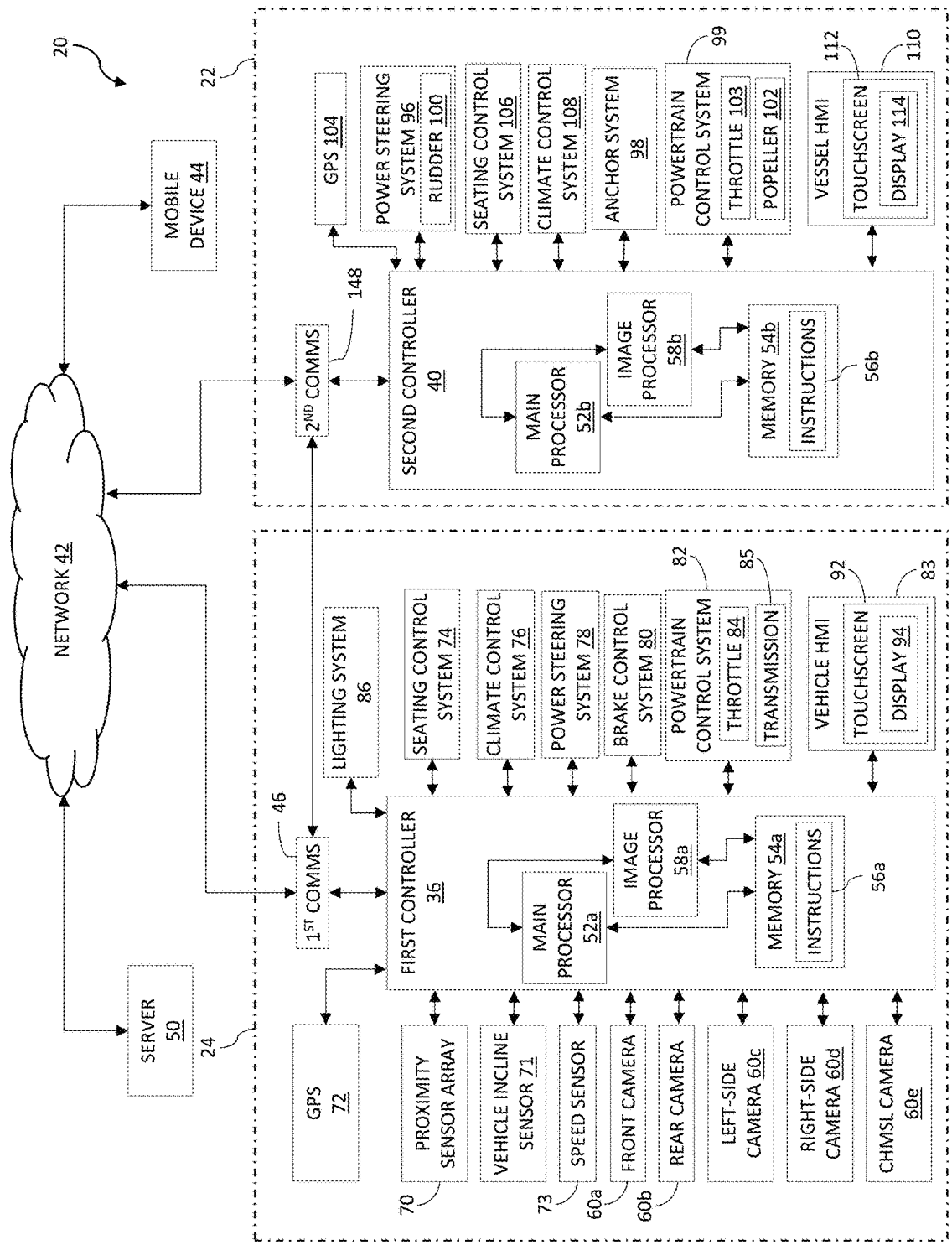
FIG. 2 depicts a block diagram of a system for assisting a docking operation for a marine vessel according to one aspect of the present disclosure.

Referring now to FIG. 2, a detailed block diagram of the system 20 is generally illustrated with including a network 42 to allow wireless or wired communication between the controller 40 of the marine vessel 22 and the controller 36 of the vehicle 24. A mobile device 44 (such as a smartphone) is also provided in communication with the network 42 for communicating with the first and second controllers 36, 40. It is generally contemplated that a controller of the mobile device 44 (not shown) may be a separate element from both the first and second controllers 36, 40 or may serve one or more control functions of the marine vessel controller 40 and/or the vehicle controller 36. For example, the mobile device 44 may be operable to control (via communication with one or more processors on-board the marine vessel 22) steering and throttle devices, as discussed further below.

A first communication module 46 may be communicatively coupled with the first controller 36. A second communication module 48 may be communicatively coupled with the second controller 40. The communication modules 46, 48 may be in direct communication with one another or may communicate with one another via the network 42, as illustrated. The network 42, which may include one or more networks having similar or different communication protocols, may have one or more wireless channel(s) and/or may connect with the vehicle 24 or the marine vessel 22 via near field communication (NFC) protocols, Bluetooth® protocols, Wi-Fi, Ultra-Wide Band (UWB), and other possible data connection and sharing techniques. In general, the communication modules 46, 48 may communicate via SMS messaging, Zigbee networking, or any of the wireless or wired communication protocols previously described (TCP/IP, e.g.). The network 42 may include or be in communication with a server 50 operable to store and access image data representative of various boat docking scenarios. By accessing this previous image data, the server 50 (and/or the first and second controllers 36, 40) may include machine learning models trained to detect various features of the boat docking operations. One or more of the servers 50 may be part of a cloud-based computing infrastructure, and/or may be associated with and/or include a Telematics Service Delivery Network (SDN) that provides digital data services to the vehicle 24 and the marine vessel 22 and other vehicles that may be part of a vehicle fleet.

Referring more particularly to the vehicle controller 36, the vehicle controller 36 may include one or more computers that may include virtual machines. The controller 36 may include a main processor 52a and a memory 54a storing instructions 56a that, when executed by the processor 52a, cause the controller 36 to read/write data to/from vehicle control systems and auxiliary systems of the vehicle 24.

Further, when executed, the instructions 56*a* may cause the controller 36 to communicate, via the first communication module 46, data to the second controller 40 and/or the mobile device 44. An image processor 58*a* may also be included with the controller 36 or separate from the controller 36 via a specialized image processing module for processing image data captured by one or more imagers in communication with the controller.

For example, front 60*a*, rear 60*b*, left side 60*c*, and right side 60*d* cameras positioned on corresponding outer walls of the vehicle 24 may be provided for capturing image data related to a boat-docking assistance operation. A center high-mount stoplight (CHMSL) camera 60*e* that is typically implemented for capturing an image of stoplights to aid in autonomous vehicle 24 functions may be provided to capture the boat docking operation. Any of the cameras 60 may be employed to capture an image of the boating operation, and the particular camera 60 chosen for image capture may be determined by the controller 36 based on a score assigned to each image view. The score may relate to the number and quality of objects related to the docking operation that may be recognizable based on the image data. In this way, the controller may prioritize the particular view automatically. For instance, if the left side of the vehicle 24 is facing open water, the image processing module may identify the left camera 60 as the optimal camera 60 for assisting in the boat-docking operation by processing image data that indicates open water.

It is generally contemplated that a substantial portion of processing the image data may take place in an image processor 58*a* of the vehicle 24, an image processor 58*b* of the marine vessel 22, an image processor of the mobile device 44, and/or an image processor stored in the remote server 50. The image processor 58 may be trained with a neural network to detect specific features generally present in a view of a docking operation, such as the dock 28, the marine vessel 22, an edge of the land 30, etc. The one or more neural networks, may be included with or otherwise accessible with a mobile application.

As previously discussed, the vehicle 24 may include a proximity sensor array 70 having one or more proximity sensors, such as capacitive sensors, LIDAR sensors, RADAR sensors, SONAR (Sound Navigation and Ranging) sensors, and the like. The proximity sensor array 70 may be part of a back-up assist module, a blind spot detection module, or another contact prevention module. The proximity sensor array 70 may be positioned adjacent front and/or rear bumpers of the vehicle 24. A vehicle incline sensor 71 may also be utilized to determine an incline of the vehicle 24 via, for example, a gyroscope or other device operable to detect a tilt of a device relative to gravity. The vehicle incline sensor 71 may operate in tandem with one or more of the cameras 60 to adjust a predicated depth determined based on an image, as well as more accurate size dimensions of objects within a field of view of the camera 60. For example, image processor 58 may determine that the marine vessel 24 is 5.0 meters from the dock 28, and the vehicle incline sensor 71 may provide data to the controller 36 indicating a forward tilt of approximately 5 degrees. The processor 52 may communicate this data to the image processor 58 to modify the estimated distance that the marine vessel 22 is away from the dock 28 from 5.0 meters feet to 4.7 meters. The modification may be based on known relationships between imager angle and depth, or may be a trained modification based on repeated training of neural networks implemented by the image processor 58.

The vehicle 24 may further include a GPS module 72 operable to communicate with the vehicle 24 and access position information related to the marine vessel 22. The GPS system may also be operable to communicate a position of the vehicle 24 to other vehicles 24, including the marine vessel 22. A speed sensor 73 may be included in the vehicle 24 for determining a speed of the vehicle 24. The vehicle speed is determined based on the speed sensor 73 and may be utilized to modify the distance estimations associated with the docking operation. For example, if the camera 60 is moving toward the marine vessel 24 at a speed of 5 km/hour, the image processor 58 may incorporate that data to adjust the estimate of the distance from the dock 28 even if processing the image data reveals that the marine vessel 24 is not advancing toward the dock 28. The speed sensor 73 may be positioned adjacent a wheel of the vehicle 24 to track movement of the wheels.

The first controller 36 may further be in communication with a seating control system 74, a climate control system 76, a power steering system 78, a brake control system 80, a powertrain control system 82, and a vehicle HMI 83. One or more of these modules may include a processor for controlling actuators. For example, the seating control system 74 may include a motor for moving a vehicle seat and/or inflatable bladders for adjusting the firmness of a vehicle seat. The climate control system 76 may include temperature, humidity, and fan speed parameters that control a heating or cooling module. The power steering system 78 may include features typically present in a power steering control module (e.g., motor-driven ball-screw/piston, torsion bar, etc.) as well as a controller for autonomously steering the vehicle 24. Similarly, the brake control system 80 may be autonomously controlled and include hydraulic elements typically included in a brake system for actuating brakes and/or engaging a brake disc/rotor at a wheel of the vehicle 24. Further, and more generally, the controller 36 may be operable to control an ignition system and an engine control system of the vehicle 24 for starting the vehicle 24 and shifting gears, etc. For example, a throttle 84 and transmission 85 may be included in the powertrain control system 82 to aid in moving the vehicle 24.

The first controller 36 may be in communication with a lighting system 86 of the vehicle 24, such as an exterior lighting system. The lighting system 86 may be operable to energize the headlights 88 or rear lights of the vehicle 24. Further, the lighting system 86 may be operable to energize high-beam lights 90 of the vehicle 24. The lights may be automatically controlled based on a solar sensor (not shown) that detects the level of exterior light (e.g., sunlight), or may be controlled to automatically turn on when the vehicle controller 36 detects that the marine vessel 22 is within proximity of the vehicle 24. Further, the second controller 40 may energize the high-beam lights 90 at specific intervals that correspond to specific sub-operations of the docking operation. For example, the high-beam lights 90 may be energized when an operator of the boat 22 leaves the marine vessel 22 and is in a mooring step (e.g., tying the boat 22 to the dock 28) of the marine vessel 22. Additionally, or alternatively, the high-beams lights 90 may be de-energized while the marine vessel 22 has yet to enter any portion of the clearance zone. In some embodiments, the controller may engage the brights 90 when the marine vessel 22 is very distant from shore. The high-beam lights 90 may be toggled on and off sequentially at a specific rate (e.g., once per second) to indicate to an operator of the boat 22 where the marine vessel 22 is to be parked and/or to show a location of the vehicle 24. In general, the low-beam lights may be operated similarly and concurrently with the high-beam lights 90. By flashing the headlights, the operator may identify the location of the slip, as well as the shore more generally. It is also generally contemplated that the direction of the lights may be optimized by controlling the orientation of the vehicle 24 generally (via autonomous control of the power steering) to direct light toward the marine vessel 22.

Regarding the vehicle HMI 83, a touchscreen 92 may be provided for allowing a user to interact with various features of the HMI 83, such as virtual pushbuttons, icons, and other digital objects to be output to a display 94 of the touchscreen 92. Through interaction with the HMI 83, the user may manually control various systems in communication with the vehicle controller 36. Further, various backup, parking, and autonomous driving routines may be activated via user selection on the HMI 83. For example, the HMI 83 may include a digital switch to communicate a signal, or many signals, to the marine vessel controller 40 and/or the mobile device 44, such as the image data from the vehicle cameras 60.

In general, various modules of the on-board controller (e.g., the second controller 40) may operate similarly to the modules present in the vehicle 24. For example, the controller may include similarly-situated processors having access to memory that stores instructions that are processed by one or more of the processors. However, some systems (e.g., a power steering system 78, the brake/anchor system 98, a powertrain control system 99) may operate differently than the power steering system 78, brake system 80, and powertrain control system 82 of the vehicle 24 due to the differences between vehicle propulsion and control techniques and boat propulsion and control techniques.

The second controller 40 may include one or more processors 52b, 58b that access the memory 54b that stores instructions 56. When executed, the instructions 56 may cause the processors 52b, 58b (or a specialty image processor) to perform operations. These operations may cause the controller 40 to monitor or output signals to/from on-board systems, the mobile device 44, and/or the vehicle controller 36. For example, the second controller 40, via the second communication module 48 aboard the marine vessel 22, may receive image data from the vehicle cameras 60. The image data may have already been modified to show the clearance zone of the slip, or the image processor 58 of the marine vessel 22 may be operable to modify the image data to show the clearance zone. In either case, the image data may cause the second controller 40 to autonomously control a rudder 100 of the power steering module 96 to steer the boat 22 to the right or to the left as previously discussed. Further, a propeller 102 of the boat 22 may be controlled (e.g., a speed or RPM of a motor controlling the propeller), and may be adjusted to change the speed of the marine vessel 22 during the docking operation. This may be accomplished via a throttle 103 of the powertrain control system 99 or via bypassing the throttle 103 via electrical signals generated from an autonomous vehicle controller. The anchor system 98 may be activated based on the image data to prevent a contact with the dock 28, the land 30, or another boat 22. The marine vessel 22 may also include a GPS module 104 for transmitting global coordinates of the marine vessel 22 to the network 42 and/or the first controller 36, as well as receiving positional data of the vehicle 24 and other vehicles.

Similar to the vehicle 24, the marine vessel 22 may also include a seating control system 106, a climate control system 108, and an HMI 110 (i.e., vessel HMI 110) having a similar touchscreen 112 and display 114. The seating control system 106 and the climate control system 108 of the marine vessel 22, as discussed later herein, may be operated based on a determined identity of a driver of the vehicle 24. The user identification data, including preference data, may be communicated to the marine vessel 22 via the second communication module 48. The second controller 40 may communicate an instruction to the climate control system 108 and/or the seating control system 106 to adjust a position of the seat and/or a climate setting of the marine vessel 22. In this way, prior to a passenger entering the marine vessel 22, the marine vessel 22 may be contoured for the prospective passenger. The ignition of the marine vessel 22 may also be energized based on proximity of the vehicle 24 to the marine vessel 22. In this way, various comfort settings of the marine vessel 22 may be applied prior to boat launch. Similarly, the vehicle 24 leaving the proximity may automatically deactivate the marine vessel 22 engine and lock access to the engine.

The mobile device 44 and/or the vessel HMI 110 may include various controls to allow an operator of the marine vessel 22 (either aboard the marine vessel 22 or on land 30) to control movement of the boat 22. In this way, semi-autonomous remote control may be applied to the marine vessel 22. For example, a throttle 116 of the marine vessel 24 may be automatically operated to output a low speed (e.g., less than 2 km/hour) to the propeller 102 while the operator controls a position of the rudder 100 via the mobile device 44. This may allow parking of the boat 22 to take place on the dock 28 without someone in the marine vessel 22. In this way, final stages of the docking operation (e.g., final mooring) may be manually completed with the operator of the boat 22 off of the boat 22.

Figure 3:
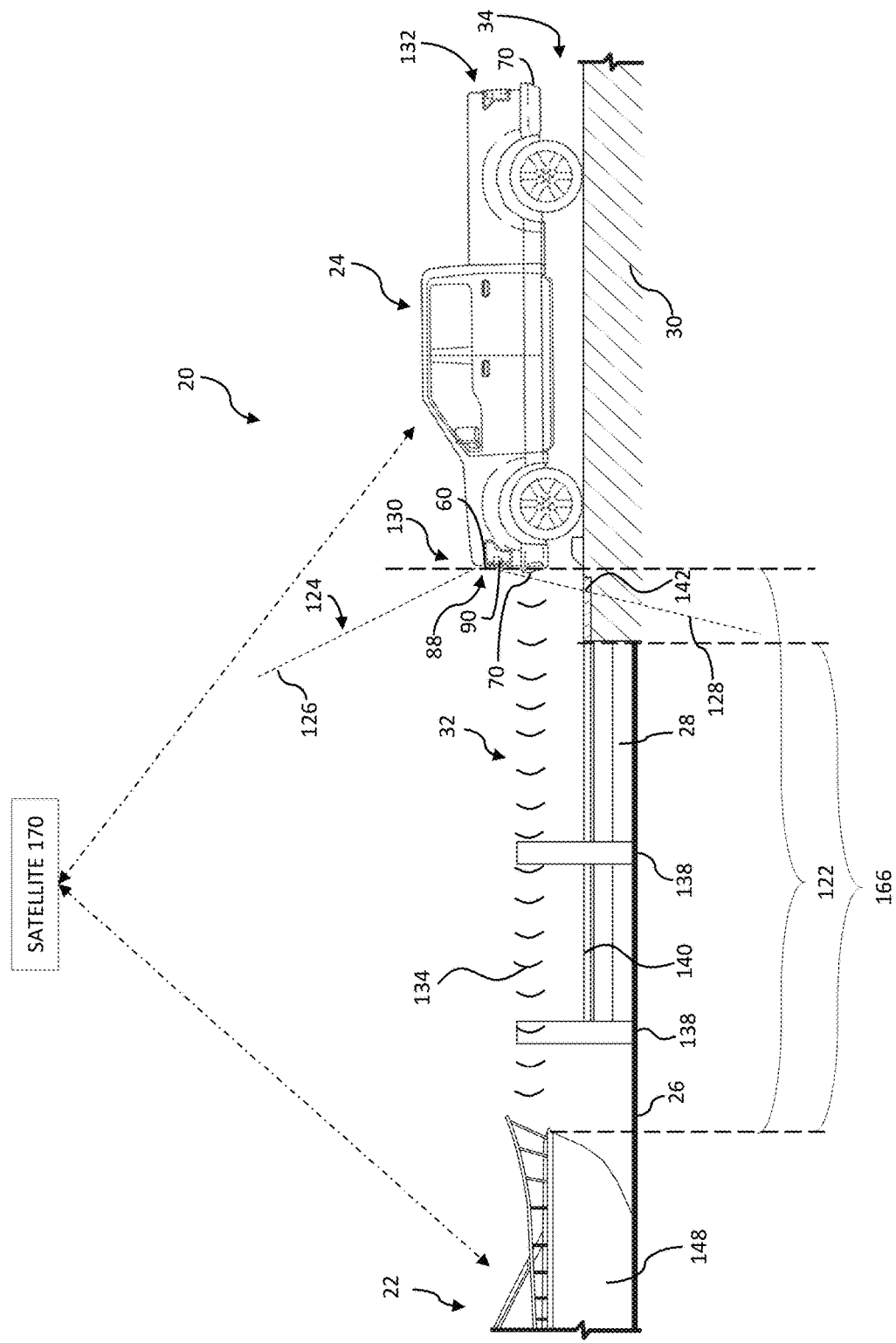
FIG. 3 depicts a side view of a vehicle and a marine vessel engaging in an exemplary docking operation according to one aspect of the present disclosure.
Figure 5:
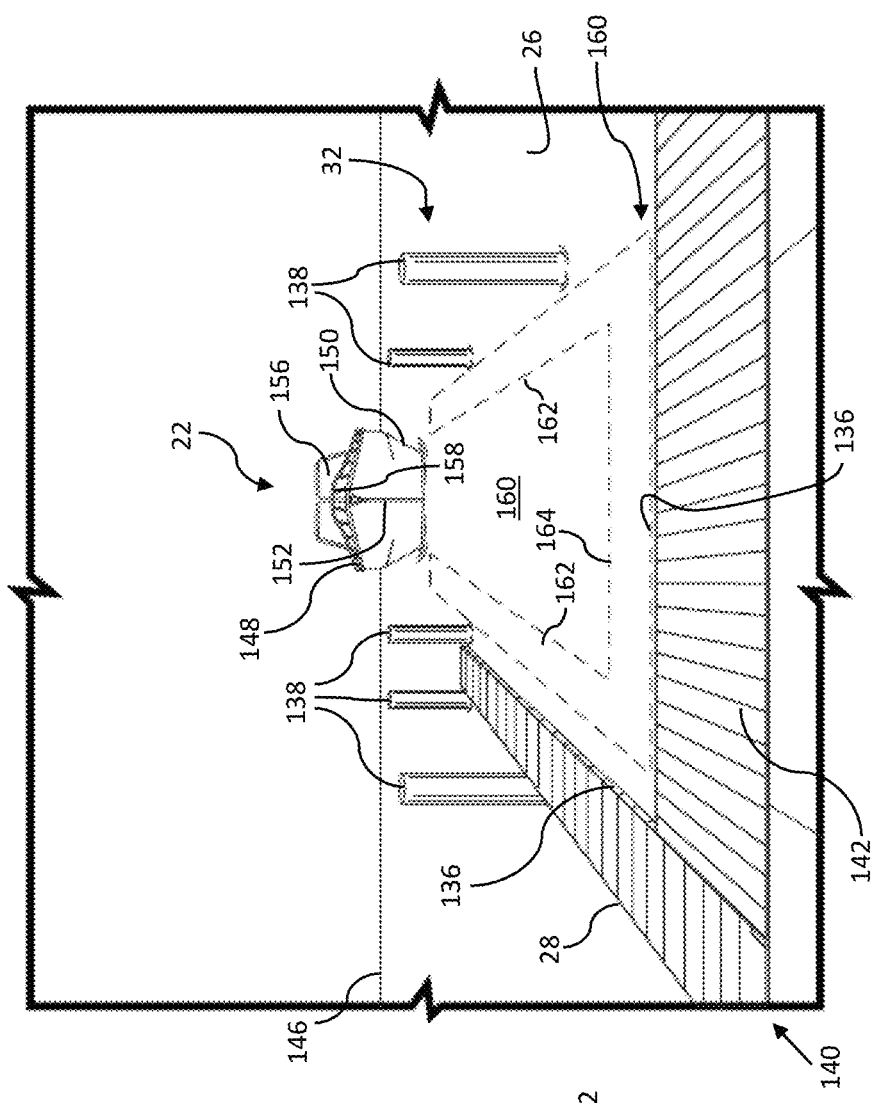
FIG. 5 depicts a portion of a field of view of an imager of the vehicle capturing the exemplary docking operation with docking assistance data overlaying the portion of the field of view according to one aspect of the present disclosure.
Figure 4:
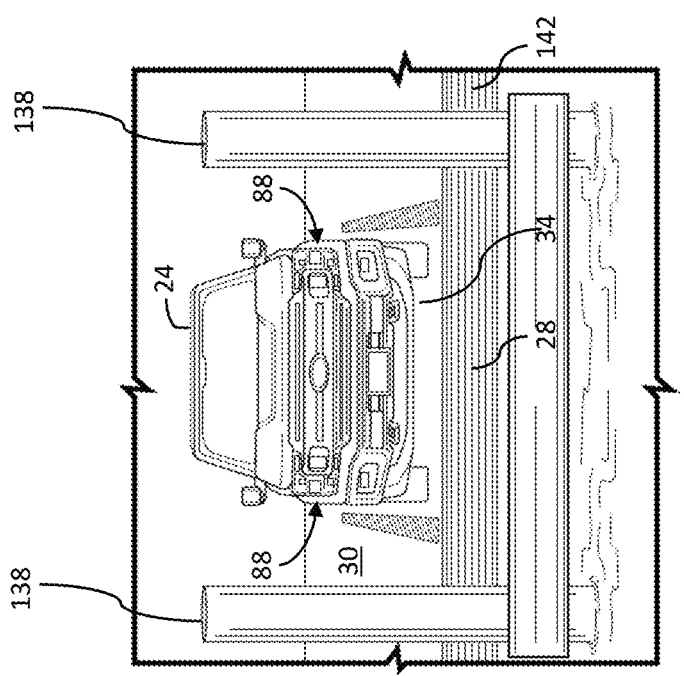
FIG. 4 depicts a front view of the vehicle from the perspective of the marine vessel during the exemplary docking operation according to one aspect of the present disclosure.

Referring now to FIGS. 3-5, the vehicle 24 and the marine vessel 22 are generally illustrated employing the system to help with the docking operation after the vehicle 24 is generally aligned with the marine vessel 22. It is generally contemplated that the vehicle 24 and the marine vessel 22 may not necessarily be directly aligned with one another (i.e., a center line of the marine vessel 22 co-linear with the center line of the vehicle 24), but may be generally aligned to allow sensors of the vehicle 24 to capture image data, position data, and the like related to the boating operation. In the example illustrated, the vehicle 24 (e.g., truck) is more or less directly aligned with the marine vessel 22 and spaced from the marine vessel 22 by a first distance 122. A camera 60 (in this example, the front camera 60a) of the vehicle 24 is generally illustrated operating with in a field of view 124 demonstrated by dashed lines (e.g., vertical field components 126, 128) for capturing an image of the boat 22 and the dock 28. The field of view 124 may be in the range of approximately 120 and 180 degrees in the vertical and horizontal directions. FIG. 5 generally represents a portion of the field of view 124 captured by the camera 60 on the vehicle 24. FIG. 4 generally illustrates a front view of the vehicle 24 from the prospective of the marine vessel 22.

The first distance 122 may be determined by a controller on the vehicle 24 based on sensor data provided by a proximity sensor positioned on a front portion 130 of the vehicle 24. In other examples, proximity and/or cameras 60 positioned on a rear 132 of the vehicle 24 may also be employed to capture the first distance 122. The proximity sensor may include RADAR, LIDAR, or capacitor sensor functions in order to provide distance data. For example, by emitting radio frequency, light, and/or sound waves, as illustrated at 134, and measuring a response to those waves, the proximity sensor array 70 may be operable to measure a distance from the vehicle 24 to the marine vessel 22. Further, the proximity sensor, or another sensor provided in the ADAS sensor arrangement, may be operable to determine the edge of the dock 136, and/or a transition from the body of water 26 to land 30. For example, the camera 60 may be operable to provide image data to the one or more processors 52, 58 for identifying objects from image data.

With reference to FIG. 5, the image data may be processed in the image processor 58 to identify one or more dock posts 138, an outboard dock 140 extending into the body of water 26, and a boardwalk dock 142 positioned adjacent the edge of the land. The image data may also be processed to determine a horizon 146, as well as the marine vessel 22 and specific features of the marine vessel 22, such as the starboard side 148, the port side 150, the bow 152, and the stern 154. Other features, such as a windshield 156, and/or a rail 158 disposed on the marine vessel 22 may be detected as well.

Referring more specifically to FIG. 5, the image data may be utilized to generate a clearance zone 160 for the marine vessel 22. The clearance zone 160 may have an outer portion that corresponds to a buffer for the marine vessel 22 in a docked position. For example, the clearance zone 160 may include lane lines 162, generated based on detection of the port 150 and starboard sides 148 of the marine vessel 22. A third parking line 164 may also extend between the side parking lines and correspond to a buffer region for the bow 152 of the marine vessel 22 or, as the case may be, the stern 154 of the marine vessel 22 in the case of the boat 22 backing into the destination. The area bounded by the lane lines 162, 164 may indicate the approximate length and width of the vessel 22. The area, width, or length of the line lines 162, 164 may reflect the distance between the dock (and other obstacles) and the vessel 22.

With continued reference to FIG. 3, the image data may be processed to determine a second distance 166 from the bow 152 of the marine vessel 22 to an edge of the boardwalk dock 142. The second distance 166 may be compared to the first distance 122 to refine the estimated distance between the marine vessel 22 and the land 30. Furthermore, the image data may include other information corresponding to features that aid in determining an edge of the land 30; for example, railings, concrete, breaker walls, etc. The distance estimates may also be based upon the horizon 146 and/or preconfigured lens properties of the camera 60 that further define the field of view 124 captured by the camera 60. It is generally contemplated that the proximity sensor may also include SONAR features, or may include a second camera having a narrow field of view 124 for capturing a detailed view of the marine vessel 22. The front camera 60 may be positioned on a dashboard of the vehicle 24 (i.e., in the cabin of the vehicle 24) or, as illustrated, may be positioned outside of the cabin and closer the front portion 130 of the vehicle 24 (e.g., near the grill of the vehicle 24). The front camera 60 may be positioned in a ceiling of the vehicle 24 adjacent the top of the windshield, or may be positioned in a component positioned on the windshield.

As previously discussed with reference to FIG. 2, a GPS system of the vehicle 24 may be operable to interact with the GPS system of the marine vessel 22, either through a mobile device 44 of a passenger onboard the marine vessel 22, an onboard communication module, one or more wearable devices positioned in the marine vessel 22, or the like. For example, as illustrated, a GPS signal 168 may be transmitted from the marine vessel 22 to the vehicle 24 via one or more satellites 170 or via traditional Global Positioning Signal transmission mediums. Based on the GPS data, the first controller 36 may be operable to determine the second distance 166, the first distance 122, a rate of change of the distance (i.e., speed of the marine vessel 22), or an acceleration of the marine vessel 22 over time.

Figure 6:
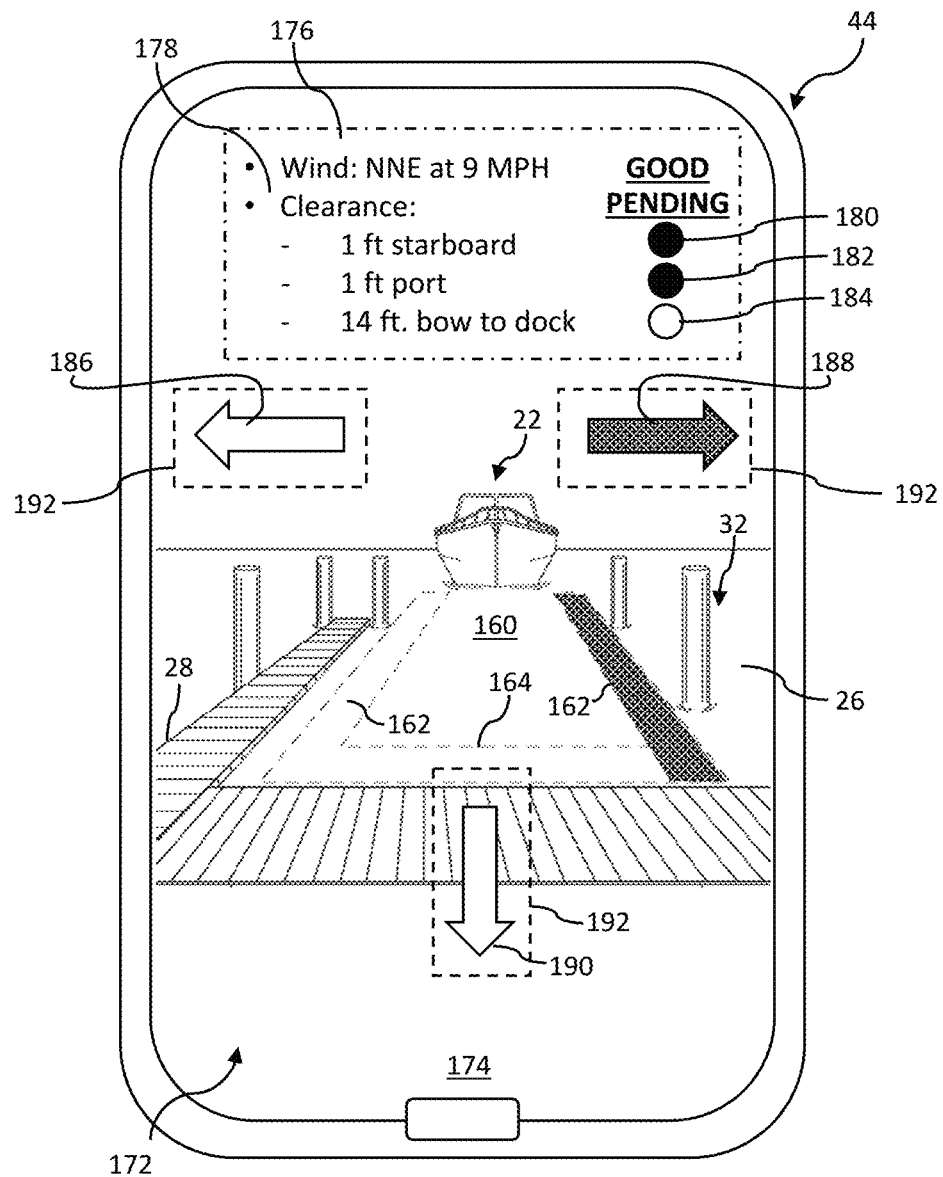
FIG. 6 depicts a mobile device displaying image data captured in the field of view with docking assistance data overlaying the image data according to one aspect of the present disclosure.

Referring now to FIG. 6, a mobile device 44 corresponding to a passenger (such as an operator) of the marine vessel 22 is generally illustrated with a user display/interface 172 for interacting with the mobile device 44. The mobile device 44 may include a processor and memory (not illustrated) as well as other electronic components commonly included in smartphones (e.g., wireless communication modules, operation systems, audio and video processing hardware). For example, an application (app) 174 may run on hardware of the mobile device 44 and may utilize the mobile device 44 to have communication with the controller 36 on the vehicle 24 and/or the controller 40 on the marine vessel 22. As such, video and/or image data captured by one or more cameras 60 of the vehicle 24 may be communicated to the mobile device 44 and displayed via the interface 172 on the mobile device 44. It is further contemplated that, although the application 174 is illustrated running on a mobile device 44, the application 174 may be operable to be executed on the human machine interface (HMI) installed on the marine vessel 22 or otherwise associated with the marine vessel 22. The interface 172 may directly or indirectly control various control functions of the boat 22, such as the engine, the rudder 100, etc., in order to steer the boat 22 into the clearance zone 160.

With continued reference to FIG. 6, the mobile device 44 is illustrated with the field of view 124 or a narrow portion of the field of view 124 of the camera 60 on the vehicle 24, with indicators and/or interactive regions overlaying the image data. For example, as illustrated, the application 174 running on the mobile device 44 may be operable to display wind, speed, and directional input information 176 and clearance information 178 associated with the boat 22 dock position. The wind, speed, and/or directional input information 176, as well as the clearance information 178, may be communicated from sensors on the vehicle 24 to the vehicle controller 36 and ultimately to the mobile device 44 via the at least one network 42. These specific features are discussed in further detail with reference to FIG. 6. As generally illustrated in FIG. 5, indicators showing the status of the information provided originating from sensors of the vehicle 24 are generally shown adjacent to that information. For example, a statement of "pending" generally illustrates that clearance for the boat 22 has yet to be determined based on the position of the boat 22 relative to the lane lines 162. For example, the status information may include a first indicator 180 associated with the starboard clearance, a second indicator 182 associated with the port clearance, and a third indicator 184 associated with the bow 152 and/or the stern 154 clearance. As shown in the illustrated example, both the starboard and port clearances are generally approved based on the boat 22 being disposed between the lane lines 162. However, because the marine vessel 22 is still spaced from (e.g., at least 14 feet/4.27 m from) the dock 28, it may be unclear to the controller 36, 40 whether or not the boat 22 is clear from the bow 152 to the dock 28.

Arrow indicators may also be included in the application overlaying the image data. For example, a first arrow 186 and a second arrow 188 may be positioned on the interface 172 and may be configured to direct a passenger on the boat 22 to steer the boat 22 to the left or the right depending on the status of the first and second arrows 186, 188. As illustrated, the right arrow (corresponding to a left side of the boat 22) may be illuminated or otherwise change in color to illustrate that the user should steer the boat 22 to the left. The lane line 162 may also illuminate or change color, similar to the second arrow 188, as illustrated to indicate that the marine vessel 22 has or does not have sufficient clearance on the port 150 or starboard sides 148 of the marine vessel 22 in the docked position. The lane lines 162, 164 may also change state based on whether the boat 22 is reducing the area of the lane lines 162, 164 by encroaching on the line lines 162, 164. A third arrow 190 may be positioned overlaying the image data, indicating forward movement of the boat 22. A similar, though not pictured, rear-ward facing arrow may be positioned to show the boat 22 moving away from the dock 28. The arrows 186, 188, 190 may be interactive upon the user touching an area (e.g., interactive area 192) of the interface 172 corresponding to the position of the arrows results in control of the boat 22. For instance, tapping the left arrow may cause the boat 22 to move forward and left (relative to the vehicle 24).

It is generally contemplated that the view shown on the mobile device 44 and/or the HMI, as the case may be, may be from the perspective of the marine vessel 22. This perspective may be generated via augmented reality or virtual reality based on one or more fields of view 124 capturing the docking operation. For instance, the mobile device 44 may be operable to generate and/or display image or video data representative of the view shown in FIG. 3. In this manner, the passenger onboard the boat 22 may have a view with the clearance zone 160, similar to that shown in FIGS. 4 and 5, but projected in front of the marine vessel 22, such that left arrow corresponds to the port side 150 of the boat 22, and the right arrow corresponds to the starboard side 148 of the boat 22. For instance, a camera 60 may be provided on the marine vessel 22 that may be of lesser quality and may have lesser processing power than a camera 60 and/or camera system of the vehicle 24. Thus, the sensor data generated via various sensors of the vehicle 24 (e.g., in the ADAS sensor suite) may be incorporated to modify image data generated from the camera 60 disposed on the marine vessel 22. This is a non-limiting embodiment, and it should be generally contemplated that all pre-existing ADAS sensors (such as the front facing camera 60*a*) may be utilized alone to aid in the docking assist system 20).

Figure 7:
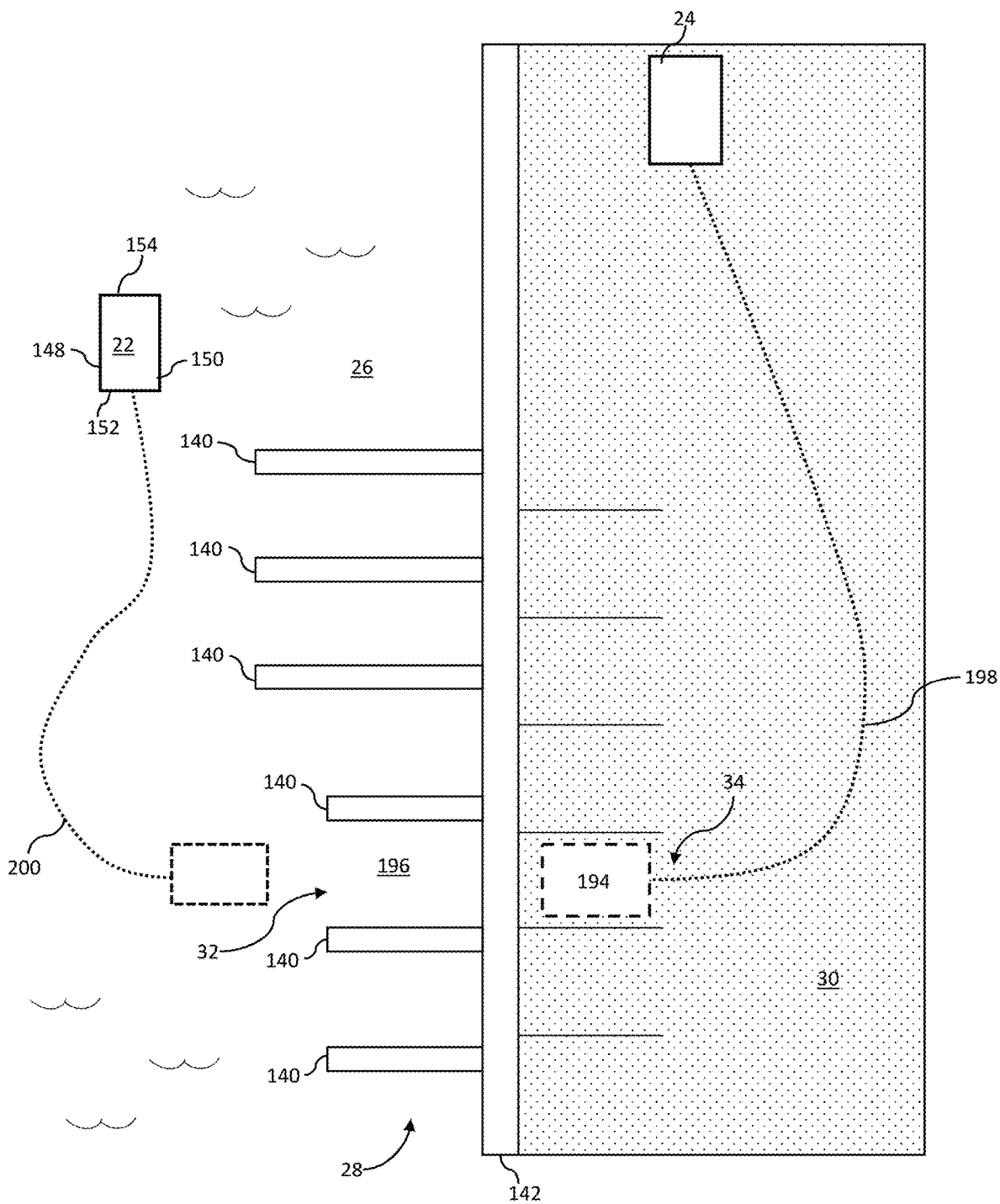
FIG. 7 depicts a top view of a system for assisting a docking operation for a marine vessel according to one aspect of the present disclosure.

Referring now to FIG. 7, an overhead view of a tracking operation of the system 20 is generally illustrated. As referred to previously, the vehicle 24 may be autonomously operated to move (i.e., drive) to a destination 194 associated with a parking spot 196 for the marine vessel 22. The vehicle 24 may be configured to drive to the destination 194 based on receiving a signal, such as a GPS signal, indicating that the marine vessel 22 is returning to shore. It is generally contemplated that any other event may trigger this signal to be communicated to and received by the vehicle 24, such as a departure of the marine vessel 22 and/or general proximity of the vehicle 24 to the marine vessel 22. By way of the example illustrated, in operation, as the marine vessel 22 approaches shore, a signal may be sent from the marine vessel 22 to the vehicle 24, indicating that the marine vessel 22 is to be docked. This signal may be sent via SMS messaging, GPS, or other wireless transmission protocols as discussed previously. Further, the signal may be automatically generated based on behavior identified by the onboard controller of the marine vessel 22 or based on specific behaviors of the passenger operating the marine vessel 22. For example, the signal may be generated based on a signal provided by the second controller 40 to the communication module 46, 48 of the marine vessel 22. The second controller 40 may determine that a return to shore event is occurring based on previous tracking of the identified operator of the marine vessel 22 and/or previous operation of the marine vessel 22 generally. The return to shore event may also be determined based on an elapsed time from when the marine vessel 22 was within a certain distance of the vehicle 24, for example.

After receiving the signal, the vehicle 24 may be configured to operate along a driving path 198 toward a destination parking spot 196 that is adjacent to the parking spot 196 of the marine vessel 22. It is generally contemplated that, although lane lines 162 are shown in a traditional parking lot in FIG. 7, any path that would allow the vehicle 24 to travel to a position adjacent the intended parking spot 196 for marine vessel 22 may be utilized, such as a dirt trail. While the vehicle 24 is traveling to the parking spot 196, or after the vehicle 24 is already at the parking spot 196, the boat 22 may follow a pathway 200 to align the boat 22 with the vehicle 24 and/or the parking spot 196. Once aligned, the marine vessel 22 may communicate a second instruction to the vehicle 24 to energize or otherwise execute a docking aid operation. For example, the marine vessel 22 may send a signal to the vehicle 24 to operate a front- or rear-facing camera 60 to capture the body of water 26 and identify the clearance zone 160 based on image data captured in the field of view 124. As previously discussed, the vehicle controller 36 may send a return instruction 56 to the marine vessel 22 to control at least one aspect of the marine vessel 22. For example, the vehicle controller 36 may be operable to control an engine of the marine vessel 22 in response to an input of the mobile device 44 and/or an HMI of the marine vessel 22.

It is generally contemplated from the present disclosure that, prior to boarding the marine vessel 22, the first controller 36 may determine a user identity corresponding to a passenger of the vehicle 24. By identifying the driver of the vehicle 24, the controller may anticipate that the driver may be boarding the marine vessel 22 to operate the marine vessel 22. Based on this determination, the first controller 36 may communicate user preference data to an onboard controller of the boat 22. The user preference data may include data related to seating position in the marine vessel 22, climate control settings of the marine vessel 22, or other positions of adjustable components on board the marine vessel 22. For example, if the identity of the driver corresponds to a 1.8 meter, 200 kg male, the first controller 36 may communicate instruction 56 to the second controller 40 to recline an operator seating position of the marine vessel 22. These operations may generally be performed regardless of whether the passenger is on board or not within the vehicle 24. What is more, the first controller 36 may be operable to communicate an instruction 56 to the second controller 40 to start the engine of the marine vessel 22.

As previously discussed, various outputs of the second controller 40 may be generated based on signals from the first controller 36. For example, during the docking operation, the second controller 40 may be operable to control the direction of the marine vessel 22, the throttle of the marine vessel 22, RPMs of a motor of the marine vessel 22, etc., in order to at least partially automate the docking process. The control outputs may be generated based on the image data and/or distance data provided via the ADAS sensors.

Further, the vehicle 24 may be operable to operate headlights and/or brights (i.e., high beam lights) traditionally implemented for illuminating areas in front of the vehicle 24 while driving. The lighting may aid in the docking operation to illuminate the field of view 124 and/or illuminate an area for an operator of the marine vessel 22 to manually control the marine vessel 22. It is also generally contemplated that based on the data provided by the sensor, the controller onboard the vehicle 24 may determine the boat 22 should be docked or should be adjusted. Further, it is generally contemplated that as the marine vessel 22 is launched from the dock 28, signal communicated from the second controller 40 may be communicated to the first controller 36 to de-energize the vehicle 24 (e.g., turn off the ignition). This instruction 56 may be generated based on a predefined distance at which the marine vessel 22 is from the vehicle 24 after launching. Another advantage of controlling the vehicle 24 based on position of the marine vessel 22 is that the vehicle 24 may serve as a marker to indicate to an operator of the marine vessel 22 where to park the marine vessel 22.

Figure 8:
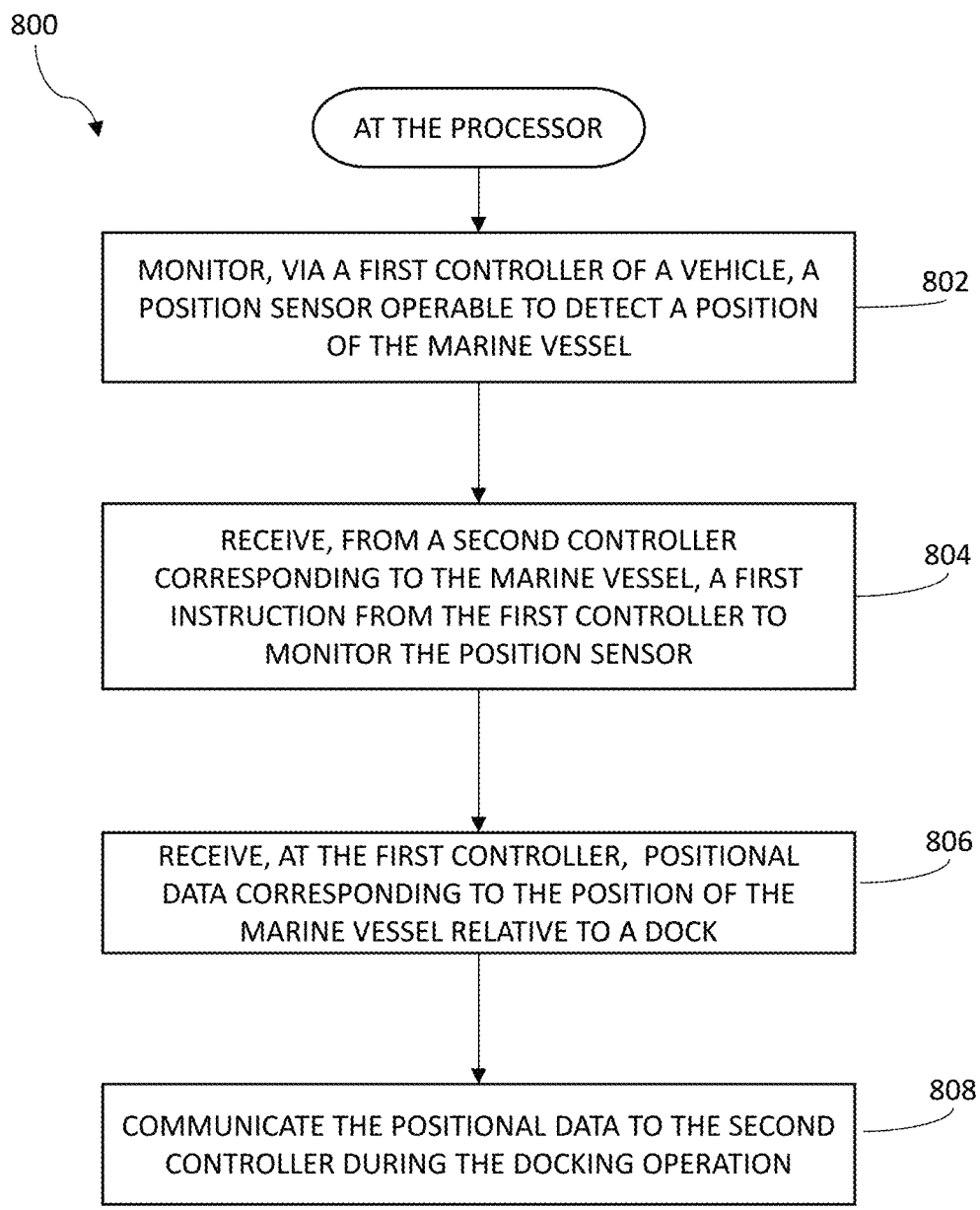
FIG. 8 depicts a flow chart of a method for assisting a docking operation for a marine vessel according to one aspect of the present disclosure.
Figure 9:
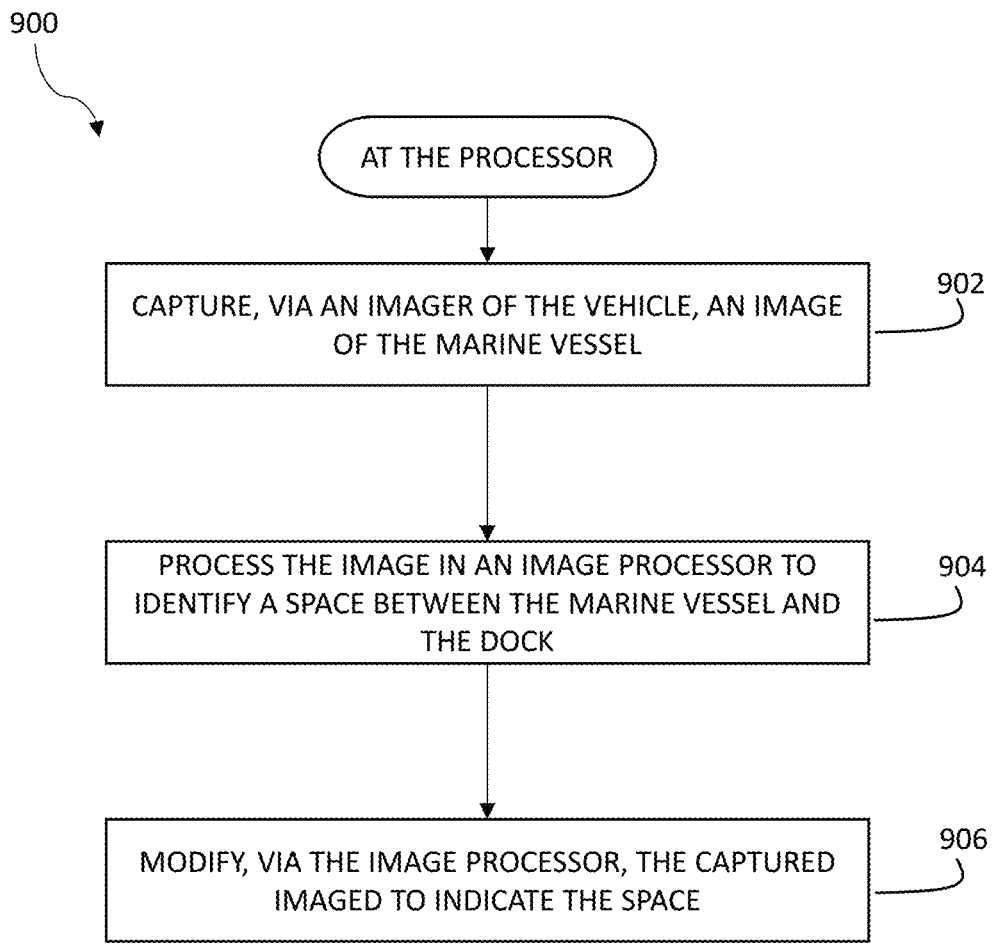
FIG. 9 depicts a flow chart of a method for assisting a docking operation for a marine vessel according to one aspect of the present disclosure.

Referring now to FIGS. 8 and 9, methods 800, 900 for assisting a docking operation are generally illustrated in flowchart form. Method 800 may include a step 802 of monitoring, via the first controller 36 of the vehicle 24, a position sensor 38 operable to detect a position of the marine vessel 22. For example, the vehicle controller 36 may receive image data from a camera 60 of the vehicle 24 that operates within a field of view 124 capturing the marine vessel 22 in the body of water 26. At step 804, the method 800 includes receiving, from a second controller 40 corresponding to the marine vessel 22, a first instruction from the first controller 36 to monitor the position sensor 38. For example, via the first and second communication modules 46, 48, the signal may be transmitted over a wireless network 42 to the mobile device 44. The method 800 further includes receiving, at the first controller 36, positional data corresponding to the position of the marine vessel 22 relative to the dock 28 at step 806. The method 800 then proceeds to step 808 of communicating the positional data to the second controller 40 during the docking operation to assist with the docking operation.

The method 900 for assisting a docking operation may include a step 902 of capturing, via an imager of the vehicle 24, an image of the marine vessel 22. At step 904, the method 900 is processing the image in an image processor 58 to identify a space between the marine vessel 22 and the dock 28. For example, the clearance zone 160 may be identified based on the dock 28 and the edge of the land 30, as well as the width, length, and height of the boat 22. At step 906, the method 900 modifies, via the image processor 58, the captured image to indicate the space. For example, the parking lines may be generated in the clearance zone 160 to indicate how much "buffer" the boat 22 has to not engage the dock 28, and the parking lines may be displayed on the interface 172. The space may be further indicated by flashing particular portions of the clearance zone 160 with different colored lights, etc. Further, audible message may be output from a speaker of the mobile device 44, the vessel HMI 110, or the vehicle HMI 83, to indicate an engagement event may occur. The audible message may vary in intensity of verbiage depending on the event that is determined to occur (i.e., engagement with land 30, scraping of the sides of the marine vessel 22, etc.).

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle for assisting a docking operation for a marine vessel, the vehicle comprising:

a position sensor operable to detect a position of the marine vessel, wherein the position sensor is an imager operable to capture image data corresponding to the marine vessel; and a first controller communicatively coupled with the position sensor, the first controller operable to:

receive a first instruction from a second controller corresponding to the marine vessel to monitor the position sensor;

receive positional data corresponding to the position of the marine vessel relative to a dock;

communicate the positional data to the second controller to assist with the docking operation wherein one of the first controller and the second controller is in communication with an image processor operable to process the image data to identify a space between the marine vessel and the dock, and wherein the image processor is configured to modify the image data to indicate the space; and receive a third instruction to operate a lighting system of a vehicle, wherein the lighting system directs light toward the marine vessel in response to the third instruction.

2. The vehicle of claim 1, wherein the first controller is further operable to communicate a second instruction to display the image data on an interface associated with the second controller.

3. The vehicle of claim 1, wherein the position sensor is one of a RADAR sensor, a LIDAR sensor, and an ultrasonic sensor.

4. The vehicle of claim 1, wherein the first controller is further operable to:

receive location data corresponding to a proximity of the vehicle relative to the marine vessel; and control the vehicle to move the vehicle toward the marine vessel based on the location data.

5. The vehicle of claim 1, wherein the second controller is included with one of a mobile device associated with a passenger of the marine vessel and an on-board controller operable to control at least one actuator of the marine vessel.

6. The vehicle of claim 1, wherein the second controller is further operable to:

receive, from the first controller, a fourth instruction to control the marine vessel.

7. The vehicle of claim 6, wherein the second controller is further operable to:

control an engine of the marine vessel in response to the fourth instruction.

8. The vehicle of claim 6, wherein the first controller is further operable to:

determine a user identity corresponding to a passenger of the vehicle; and communicate user preference data to the second controller based on the user identity; and wherein the second controller is further operable to:

control the marine vessel based on the user preference data in response to the fourth instruction.

9. The vehicle of claim 8, wherein the user preference data includes one of a climate control preference and a seating position preference.

10. A method for assisting a docking operation of a marine vessel, the method comprising:

monitoring, via a first controller of a vehicle, a position sensor operable to detect a position of the marine vessel;

receiving, from a second controller corresponding to the marine vessel, a first instruction from the first controller to monitor the position sensor;

receiving, at the first controller, positional data corresponding to the position of the marine vessel relative to a dock;

capturing, via an imager of the vehicle, an image of the marine vessel;

processing the image in an image processor to identify a space between the marine vessel and the dock;

modifying, via the image processor, the captured image to indicate the space;

communicating the positional data to the second controller to assist with the docking operation; and receiving, at the first controller, a third instruction to operate a lighting system of the vehicle, wherein the lighting system directs light toward the marine vessel in response to the third instruction.

11. The method of claim 10, further comprising:

receiving, at the first controller, location data corresponding to a proximity of the vehicle relative to the marine vessel; and controlling the vehicle to move the vehicle toward the marine vessel based on the location data.

12. The method of claim 10, further comprising:

receiving, at the second controller, a second instruction from the first controller to control the marine vessel.

13. The method of claim 12, further comprising:

determining a user identity corresponding to a passenger of the vehicle;

communicating user preference data to the second controller based on the user identity; and controlling, via the second controller, the marine vessel based on the user preference data in response to the second instruction.

14. A vehicle for assisting a docking operation for a marine vessel, the vehicle comprising:

a position sensor operable to detect a position of the marine vessel, wherein the position sensor is an imager operable to capture image data corresponding to the marine vessel; and a first controller communicatively coupled with the position sensor, the first controller operable to:

receive an instruction from a second controller corresponding to the marine vessel to monitor the position sensor;

receive location data corresponding to a proximity of the vehicle relative to the marine vessel;

control the vehicle to move toward the marine vessel based on the location data;

receive positional data corresponding to a space between the marine vessel and a dock;

communicate the positional data to the second controller to assist with the docking operation, wherein one of the first controller and the second controller is in communication with an image processor operable to process the image data to identify a space between the marine vessel and the dock, and wherein the image processor is configured to modify the image data to indicate the space; and receive a third instruction to operate a lighting system of the vehicle, wherein the lighting system directs light toward the marine vessel in response to the third instruction.

* * * * *